United States Patent
Cantley et al.

(10) Patent No.: US 11,634,647 B2
(45) Date of Patent: *Apr. 25, 2023

(54) TOWER BOTTOMS COKE CATCHING DEVICE

(71) Applicant: MARATHON PETROLEUM COMPANY LP, Findlay, OH (US)

(72) Inventors: Gregory A. Cantley, Findlay, OH (US); Ross Vail, Findlay, OH (US); Kathleen Yaden, Findlay, OH (US); Ray Brooks, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/523,776

(22) Filed: Nov. 10, 2021

(65) Prior Publication Data

US 2022/0064542 A1 Mar. 3, 2022

Related U.S. Application Data

(63) Continuation of application No. 16/946,584, filed on Jun. 29, 2020, now Pat. No. 11,203,719, which is a
(Continued)

(51) Int. Cl.
*C10G 9/16* (2006.01)
*C10G 9/20* (2006.01)
(Continued)

(52) U.S. Cl.
CPC .............. *C10G 9/16* (2013.01); *B01D 45/08* (2013.01); *B01J 8/008* (2013.01); *C10G 9/18* (2013.01);
(Continued)

(58) Field of Classification Search
CPC ... C10G 9/16; C10G 9/18; C10G 9/20; C10G 45/02; C10G 47/00; C10G 2300/107;
(Continued)

(56) References Cited

U.S. PATENT DOCUMENTS 3,771,638 A * 11/1973 Schneider ............... F28F 19/00
55/DIG. 20
4,764,347 A 8/1988 Milligan
(Continued)

OTHER PUBLICATIONS

Philip Lopiccolo, Coke trap reduces FCC slurry exchanger fouling for Texas refiner, Journal, Sep. 8, 2003.
(Continued)

*Primary Examiner* — Randy Boyer
*Assistant Examiner* — Juan C Valencia
(74) *Attorney, Agent, or Firm* — Womble Bond Dickinson (US) LLP

(57) ABSTRACT

A coke catching apparatus for use in hydrocarbon cracking to assist in the removal of coke and the prevention of coke build up in high coking hydrocarbon processing units. The apparatus includes a grid device for preventing large pieces of coke from entering the outlet of the process refining equipment while allowing small pieces of coke to pass through and be disposed of. The coke catching apparatus can be easily disassembled to be removed from the refining process equipment and cleaned.

11 Claims, 2 Drawing Sheets

Related U.S. Application Data continuation of application No. 16/124,322, filed on Sep. 7, 2018, now Pat. No. 10,696,906.

(60) Provisional application No. 62/565,227, filed on Sep. 29, 2017.

(51) Int. Cl.
  *B01D 45/08* (2006.01)
  *C10G 45/02* (2006.01)
  *C10G 9/18* (2006.01)
  *B01J 8/00* (2006.01)
  *C10G 47/00* (2006.01)

(52) U.S. Cl.
  CPC ............... *C10G 9/20* (2013.01); *C10G 45/02* (2013.01); *B01J 8/003* (2013.01); *C10G 47/00* (2013.01); *C10G 2300/107* (2013.01); *C10G 2300/1077* (2013.01); *C10G 2300/4031* (2013.01); *C10G 2300/4056* (2013.01); *C10G 2300/708* (2013.01)

(58) Field of Classification Search
  CPC .... C10G 2300/1077; C10G 2300/4031; C10G 2300/4056; C10G 2300/708; B01D 45/08; B01J 8/008; B01J 8/003
  See application file for complete search history.

(56) References Cited

U.S. PATENT DOCUMENTS

| | | |
|---|---|---|
| 5,258,117 A | 11/1993 | Kolstad et al. |
| 8,647,415 B1 | 2/2014 | De Haan et al. |
| 10,696,906 B2 | 6/2020 | Cantley et al. |
| 2008/0207974 A1 | 8/2008 | McCoy et al. |
| 2012/0125813 A1 | 5/2012 | Bridges et al. |
| 2014/0024873 A1 | 1/2014 | De Haan et al. |
| 2015/0071028 A1 | 6/2015 | Glanville |
| 2019/0100702 A1 | 4/2019 | Cantley et al. |

OTHER PUBLICATIONS

Daryl W. Hanson et al., An atmospheric crude tower revamp, Article, Jul. 2005.

Niaei et al., Computational Study of the Pyrolysis Reactions and Coke Deposition in Industrial Naphtha Cracking, P.M.A. Sloot et al. (Eds.): ICCS 2002, LNCS 2329, pp. 723-732 (Year: 2002).

* cited by examiner

Base Case

2014-CE    2017-NCE    2019-NCE    2021-CE w/ Coke Catcher

2014-CE    2018-NCE    2021-CE

TOWER BOTTOMS COKE CATCHING DEVICE

CROSS REFERENCE TO RELATED APPLICATIONS

This application is a continuation, and claims priority to and the benefit of U.S. Non-Provisional application Ser. No. 16/946,584, filed Jun. 29, 2020, titled "TOWER BOTTOMS COKE CATCHING DEVICE," which is a continuation of U.S. Non-Provisional application Ser. No. 16/124,322, filed Sep. 7, 2018, titled "TOWER BOTTOMS COKE CATCHING DEVICE," now U.S. Pat. No. 10,696,906, issued Jun. 30, 2020, which claims priority to and the benefit of U.S. Provisional Application No. 62/565,227, filed Sep. 29, 2017, titled "TOWER BOTTOMS COKE CATCHING DEVICE," the full disclosures of which are hereby incorporated herein by reference in their entirety.

FIELD OF DISCLOSURE

The present invention relates to an apparatus for use in hydrocarbon cracking. The apparatus is specifically intended for use in assisting in the removal of coke and the prevention of coke build up in high coking units that are used for hydrocarbon cracking.

BACKGROUND OF THE INVENTION

Refining of petroleum products to produce gasoline and other olefinic products can result in some of the processing units producing significant secondary byproducts, most notably carbonatious deposits or coke. In particular, fired tubular furnace reactors utilizing process reactor tubes, such as resid hydrotreaters, atmospheric towers, vacuum towers, FCC main fractionators, coker main fractionators, and the like form deposits of coke byproducts on the inside of the reactors and on the process tubes of the reactors. The coke deposits inhibit effective heat transfer, thereby resulting in inefficient processes.

For instance, atmospheric towers used with resid hydrotreaters have a typical operating cycle which includes declining capacity through the third year and ultimate shutdown of the atmospheric tower due to coke formations and large pieces of coke plugging the outlet lines for the tower bottoms. Management of the coke is critical to efficiency and, ultimately, the turnaround cycle of the atmospheric tower.

Therefore, it is an object of the invention to more easily remove coke formed in the reactor units, thereby allowing the reactor unit to run more efficiently for a longer period of time.

Another object of the invention is to prevent large pieces of coke from clogging the outlet lines for the tower bottoms.

Another object of the present invention is to catch and remove large pieces of coke spalling off the interior components of the reactor unit.

The objects of the invention are readily realized by the following apparatus.

SUMMARY OF THE INVENTION

The coke catcher of the present invention is basically a grid device or colander-like device that is positioned within the reactor unit to catch large pieces of coke that spall off the walls of the unit. The apparatus is specifically designed to pass smaller pieces of coke through to the pump suction baskets while retaining the larger pieces of coke within the unit. The internal coke catcher installed in the reactor unit protects the unit outlet piping from becoming clogged with large pieces of spalled coke. The large pieces of spalled coke sometimes occur due to thermal cycling from an unplanned shutdown. The present invention is intended to reduce the frequency of unintended shutdowns and increase the predictability in length of time between planned turnarounds of the reactor unit.

The coke catcher prevents large pieces of coke from entering the outlet lines upstream of the bottoms pump suction screens. The bottoms pumps have two suction screens per pump that are designed to prevent coke from reaching the bottoms pump. The coke catcher prevents the larger pieces of coke from collecting in the outlet piping in the section upstream of the suction screens and restricting the outlet line flow of bottoms through the outlet line. The larger pieces of coke are particularly problematic because they cannot be flushed to the pump suction screens where they can be removed. The piping layout from the towers to the screens includes a series of bends that inhibits movement of large pieces of coke through the piping.

The grid spacing of the coke catcher is sized to be larger than the pump suction basket screens to allow coke which can be managed by the baskets to pass through to the screens while retaining larger coke materials in the reactor unit.

The apparatus also includes a vaulted chimney hat to keep coke from settling on top of the apparatus.

The present invention creates a tubular colander shaped coke catcher which allows smaller pieces of coke and liquid to flow into the bottom outlet nozzle of the reactor unit, while retaining larger pieces of coke inside the reactor unit. Over time, the larger pieces of coke will sometimes break up and exit the reactor. Otherwise they are removed during a planned shutdown.

DESCRIPTION OF THE PREFERRED EMBODIMENT

Figure 1:
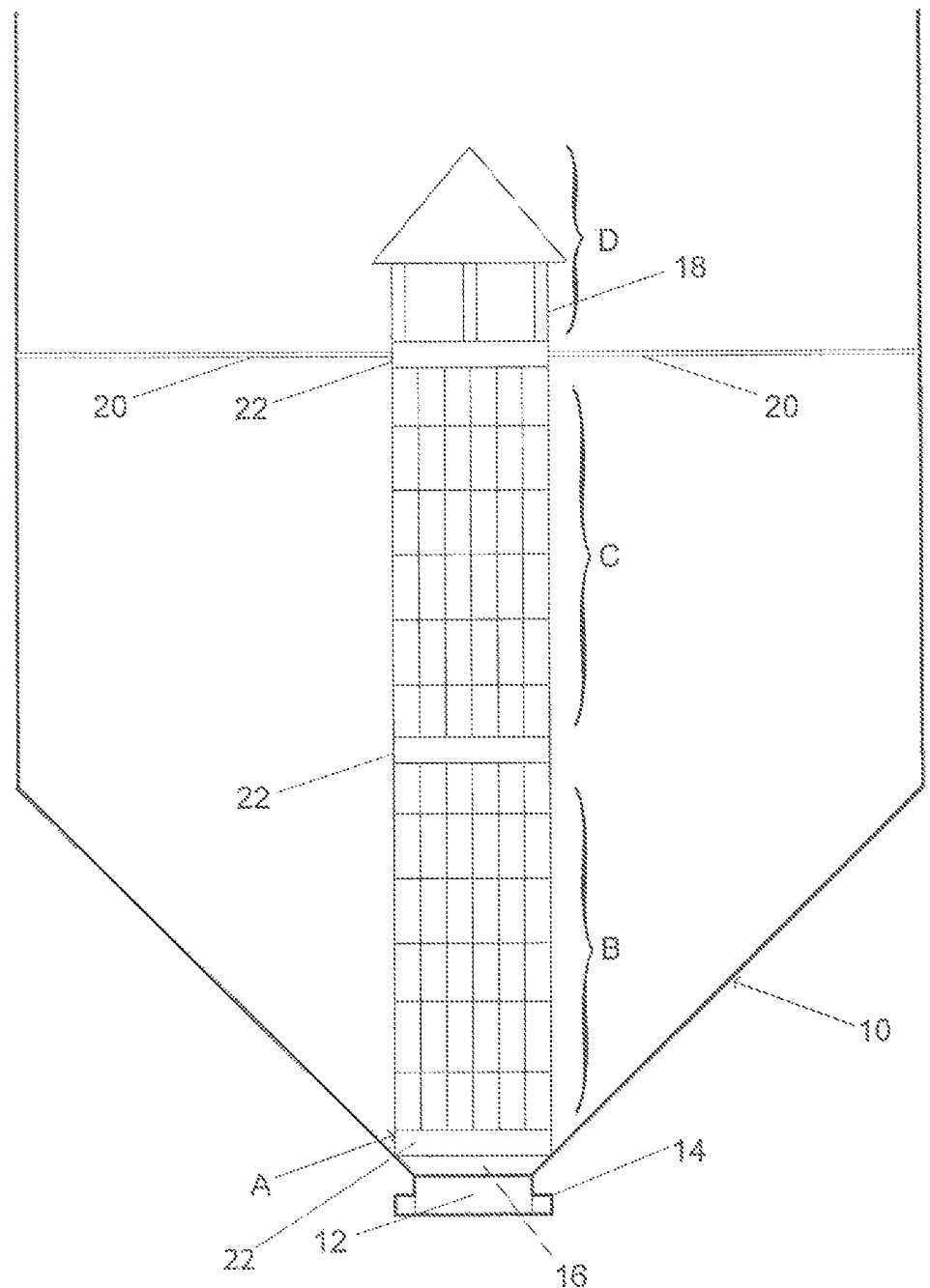
FIG. 1 is a schematic depiction of a reactor unit tower having the coke catcher invention placed inside.

The present invention is shown by schematic in FIG. 1 as having a reactor unit, such as a fractionator or atmospheric tower (10) with a bottom outlet (12) and outlet nozzle (14). The bottom (16) of the coke catcher is a solid plate designed to fit over the outlet (12) of the atmospheric tower. Preferably, the diameter of the bottom plate (16) should overlap the diameter of the outlet (12) by a minimum of two inches. The bottom plate (16) includes a plurality of drain holes that allow all of the product to exit the atmospheric tower for the purpose of a shutdown, such that no product is left in the unit.

The coke catcher is preferably made up of four units A, B, C and D, which can be easily disassembled to assist in removing the coke catcher from the interior of the atmospheric tower to allow for cleaning of the coke catcher. Section A of the coke catcher includes the bottom (16). Sections B and C provide a colander-like grid for screening the coke particles. Preferably, the bar spacing of the grid is a minimum of four inches to prevent coke buildup on the bars. Sections B, C and D are held together by clamp members (22) which allow for sections B, C and D to be separated from one another for easy maintenance. Section D is the top hat portion of the coke catcher which prevents coke from settling on top of the coke catcher. The gap between the top hat and the top of section C is, preferably, a minimum of twelve inches to avoid coke spreading and potential plugging. As the coke spalls off the walls of the atmospheric tower, it enters the coke catcher through the colander sections B and C and through the hat supports (18). The coke catcher is supported within the atmospheric tower by support bars (20).

EXPERIMENTAL PERFORMANCE OF THE COKE CATCHER

Figure 2:
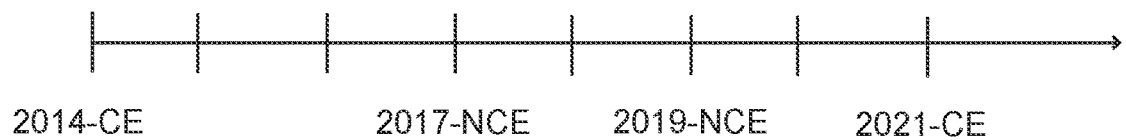
FIG. 2 is a graphical representation of the Base Case timeline of experimental performance.
Figure 2:

During the last turnaround of a Resid Hydrotreater Unit (RHU), the coke catcher of the present invention was installed in the atmospheric tower. The historic record of the atmospheric tower of this particular RHU typically had the third year of its cycle as the most challenging. For instance, as illustrated in FIG. 2, the third year (2016) the unit experienced serious capacity decline prior to a planned Non-Cycle ending Turnaround (NCE) in 2018. During the third year of the experimental cycle, after the installation of the coke catcher, the unit did not experience the typical capacity decline but instead set record rates. The performance centered around not having issues with the outlet hydraulics of the atmospheric tower. The improved tower bottoms hydraulics enabled an originally planned Non-Cycle Ending Turnaround (NCE) to be extended an additional year. The extension eliminated one NCE turnaround prior to the future Cycle Ending (CE) turnaround. The results of the experiment reduced the unit down time by one NCE turnaround over a 7-year period. The net impact is reduced maintenance expense and increased annual production.

An additional benefit to the installation of the coke catcher is the ability to better recover from unplanned unit shutdowns from process.

One indicator of atmospheric tower bottoms fouling is the temperature difference between feed zone and bottom product temperatures. An increase in this delta temperature suggests increased coke growth in the tower and bottoms circuit. An increase in delta temperatures is indicative of increased thermal cycling in the tower. Such thermal cycling of the tower can cause coke in the vessel to spall off and be flushed out. If the coke catcher were not installed the coke would have plugged the outlet line completely. A tower NCE turnaround would have been needed before restarting the unit. The NCE turnaround was unnecessary, resulting in a more efficient and rapid startup of the unit.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

The invention claimed is:

1. A coke catching device to be positioned inside a petroleum product processing unit that refines a petroleum liquid, the coke catching device comprising:
    a bottom section having a plurality of apertures therein, the bottom section configured to be positioned inside the petroleum product processing unit adjacent an outlet thereof;
    a grid section connected to the bottom section and having a tubular grid including a plurality of openings therein, the plurality of openings being sized to retain large spalled coke pieces on an outer side of the grid section and to permit at least some spalled coke pieces to pass therethrough, the large spalled coke pieces defined as those spalled coke pieces that do not fit through the plurality of openings in the grid section, and the grid section having a diameter being at least about 2 inches larger than a diameter of the outlet;
    a top section connected to the grid section, each of the top section, the grid section, and the bottom section in combination defining a liquid pathway through one or more of the plurality of openings of the grid section, into an inner portion of the grid section, through one or more of the plurality of apertures of the bottom section and into the outlet of the petroleum product processing unit, thereby to allow small pieces of coke contained in the liquid petroleum product within the petroleum product processing unit to pass through to the outlet while preventing large pieces of coke contained in the liquid petroleum product from passing through when the petroleum liquid flows into the grid section and to the outlet prior to output of the refined petroleum liquid; and
    a clamp, the top section and the grid section being connected by the clamp.

2. The coke catching device of claim 1, wherein the plurality of apertures in the bottom section are sized to permit the at least some spalled coke pieces to pass therethrough into the outlet of the petroleum product processing unit.

3. The coke catching device of claim 1, wherein the top section includes a hat portion, wherein the grid section comprises the tubular grid, the coke catching device further comprising a plurality of hat supports, and wherein the hat portion is connected to the tubular grid through the plurality of hat supports, thereby to permit at least some spalled coke pieces to pass there between.

4. The coke catching device of claim 1, wherein the petroleum product processing unit comprises an atmospheric tower.

5. A method of catching spalled coke inside a petroleum product processing unit that refines a petroleum liquid, the method comprising:
    operating a petroleum product processing unit having a coke catching device positioned proximate an outlet of the petroleum product processing unit, the coke catching device includes a bottom section disposed adjacent the outlet, a grid section connected to the bottom section and having a plurality of openings therein, and a top section connected to the grid section, the coke catching device also having a liquid fluid pathway through one or more of the plurality of openings in the grid section, into an inner portion of the grid section, through the bottom section, and into the outlet, the grid section having a diameter being at least about 2 inches larger than a diameter of the outlet, and each of the plurality of openings of the grid section being at least about 4 inches wide;
    flowing the petroleum liquid having spalled coke therein through at least a portion of the petroleum product processing unit and into the coke catching device through the plurality of openings in the grid section thereof;
    retaining large coke pieces on an outer side of the grid section, the large coke pieces defined as those coke pieces that do not fit through one or more of the plurality of openings of the grid section;

permitting coke pieces that fit through one or more of the plurality of openings of the grid section to flow with the petroleum fluid along the liquid fluid pathway; and removing the top section, the grid section, the bottom section from inside the petroleum product processing unit during a shutdown of the petroleum product processing unit.

6. The method of claim 5, further comprising operating the petroleum product processing unit to create thermal cycling therein, thereby to cause coke in the petroleum product processing unit to spall off interior walls thereof.

7. A method of catching spalled coke inside a petroleum product processing unit that refines a petroleum liquid, the method comprising:

operating a petroleum product processing unit having a coke catching device positioned proximate an outlet of the petroleum product processing unit, the coke catching device including a bottom section disposed adjacent the outlet, a grid section connected to the bottom section and having a plurality of openings therein, and a top section connected to the grid section, the coke catching device also having a liquid fluid pathway through one or more of the plurality of openings in the grid section, into an inner portion of the grid section, through the bottom section, and into the outlet, the petroleum product processing unit including an atmospheric tower;

flowing the petroleum liquid having spalled coke therein through at least a portion of the petroleum product processing unit and into the coke catching device through the plurality of openings in the grid section thereof;

retaining large coke pieces on an outer side of the grid section, the large coke pieces defined as those coke pieces that do not fit through one or more of the plurality of openings of the grid section; and permitting coke pieces that fit through one or more of the plurality of openings of the grid section to flow with the petroleum fluid along the liquid fluid pathway.

8. The method of claim 7, further comprising disconnecting the top section, the grid section, and the bottom section from each other during a shutdown of the petroleum product processing unit.

9. The method of claim 7, further comprising operating the petroleum product processing unit to create thermal cycling therein, thereby to cause coke in the petroleum product processing unit to spall off interior walls thereof.

10. A method of catching spalled coke inside a petroleum product processing unit that refines a petroleum liquid, the method comprising:

operating a petroleum product processing unit having a coke catching device positioned proximate an outlet of the petroleum product processing unit, the coke catching device including a bottom section disposed adjacent the outlet, a grid section connected to the bottom section and having a plurality of openings therein, and a top section connected to the grid section, the coke catching device also having a liquid fluid pathway through one or more of the plurality of openings in the grid section, into an inner portion of the grid section, through the bottom section, and into the outlet, the top section including a hat portion, the grid section including a tubular grid section, the coke catching device further including a plurality of hat supports, the hat portion being connected to the tubular grid section through the plurality of hat supports, thereby to permit at least some spalled coke pieces to pass there between;

flowing the petroleum liquid having spalled coke therein through at least a portion of the petroleum product processing unit and into the coke catching device through the plurality of openings in the grid section thereof;

retaining large coke pieces on an outer side of the grid section, the large coke pieces defined as those coke pieces that do not fit through one or more of the plurality of openings of the grid section;

permitting coke pieces that fit through one or more of the plurality of openings of the grid section to flow with the petroleum fluid along the liquid fluid pathway; and passing the petroleum liquid through into the tubular grid section from areas adjacent the plurality of hat supports.

11. The method of claim 10, further comprising operating the petroleum product processing unit to create thermal cycling therein, thereby to cause coke in the petroleum product processing unit to spall off interior walls thereof.

* * * * *